US010310736B1

(12) United States Patent
Yu et al.

(10) Patent No.: US 10,310,736 B1
(45) Date of Patent: Jun. 4, 2019

(54) SYSTEMS AND METHODS FOR STORING DATA (71) Applicant: Veritas Technologies LLC, Mountain View, CA (US)

(72) Inventors: Junheng Yu, Chengdu (CH); Hongbin Gong, Chengdu (CH); Stephan Gipp, St Louis Park, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 102 days.

(21) Appl. No.: 15/388,885

(22) Filed: Dec. 22, 2016

(51) Int. Cl.
G06F 12/00 (2006.01)
G06F 13/00 (2006.01)
G06F 3/06 (2006.01)

(52) U.S. Cl.
CPC ............ *G06F 3/0608* (2013.01); *G06F 3/064* (2013.01); *G06F 3/065* (2013.01); *G06F 3/0619* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 5,867,443 A * | 2/1999 | Linderman | ........... | G11C 11/005 365/154 |
| 6,247,105 B1 * | 6/2001 | Goldstein | ............. | G06F 9/5016 711/170 |
| 9,009,565 B1 * | 4/2015 | Northcott | ............... | G11C 29/42 365/185.09 |
| 9,294,132 B1 * | 3/2016 | Peleato-Inarrea | ........................... | H03M 13/2948 |
| 10,133,760 B2 * | 11/2018 | Attaluri | ............... | G06F 16/2237 |
| 2007/0260827 A1 * | 11/2007 | Zimmer | .............. | G06F 12/0638 711/154 |
| 2008/0120459 A1 * | 5/2008 | Kaneda | ............... | G06F 11/1451 711/112 |

(Continued)

OTHER PUBLICATIONS

Cleversafe, Why RAID is Dead for Big Data Storage the business case for why IT Executives are making a strategic shift from RAID to Information Dispersal, http://docs.media.bitpipe.com/io_10x/io_103356/item_496432/Cleversafe%20-%20Why%20RAID%20is%20Dead%20for%20Big%20Data%20Storage.pdf, Copyright 2011.

(Continued)

*Primary Examiner* — Sean D Rossiter
(74) *Attorney, Agent, or Firm* — FisherBroyles, LLP (57) ABSTRACT

The disclosed computer-implemented method for storing data may include (i) identifying a request to backup a set of data according to a storage-as-a-service configuration that stores data into cloud storage, (ii) dividing the set of data to be backed up into chunks of data, (iii) dividing, for each of the chunks of data, a respective chunk into blocks of data, (iv) generating, for each of the chunks of data, at least one block of parity bits for the respective chunk of data based on applying an erasure code to the blocks of data, and (v) splitting, during backing up the chunks of data according to the storage-as-a-service configuration, the respective blocks of data and the generated block of parity bits into heterogeneous storage media targets such that the storage-as-a-service configuration benefits from the heterogeneous storage media targets. Various other methods, systems, and computer-readable media are also disclosed.

20 Claims, 5 Drawing Sheets

(56) References Cited

U.S. PATENT DOCUMENTS

| | | | | |
|---|---|---|---|---|
| 2009/0144496 | A1* | 6/2009 | Kawaguchi | G06F 3/0608 711/114 |
| 2014/0115579 | A1* | 4/2014 | Kong | G06F 3/0605 718/1 |
| 2018/0018096 | A1* | 1/2018 | Fekete | G06F 3/061 |
| 2019/0026182 | A1* | 1/2019 | Varanasi | G11C 29/42 |

OTHER PUBLICATIONS

Burns, et al., Rethinking Erasure Codes for Cloud File Systems: Minimizing I/O for Recovery and Degraded Reads, http://www.cs.jhu.edu/~okhan/fast12.pdf, Proceedings of the 10th USENIX conference on File and Storage Technologies, Feb. 2012.

Intel, Revolutionary Methods to Handle Data Durability Challenges for Big Data Intel and Amplidata address the storage challenges presented by the coming tsunami of unstructured data that will stress data center scalability, http://media12.connectedsocialmedia.com/intel/12/9530/Revolutionary_Methods_Handle_Data_Durability_Challenges_Big_Data.pdf, Copyright 2012.

Papailiopoulos, et al., Simple Regenerating Codes: Network Coding for Cloud Storage, https://arxiv.org/pdf/1109.0264.pdf, Sep. 1, 2012.

Sathiamoorthy, et al., XORing Elephants: Novel Erasure Codes for Big Data, http://anrg.usc.edu/~maheswaran/Xorbas.pdf, Copyright 2013.

Arnold, Erasure Codes With OpenStack Swift—Digging Deeper, https://www.swiftstack.com/blog/2013/07/17/erasure-codes-with-openstack-swift-digging-deeper/#sthash.rS7FjEpQ.dpuf, Jul. 17, 2013.

Plank, et al., A Performance Evaluation and Examination of Open-Source Erasure Coding Libraries for Storage, http://citeseerx.ist.psu.edu/viewdoc/download?doi=10.1.1.145.9642&rep=rep1&type=pdf, FAST '09: 7th USENIX Conference on File and Storage Technologies, 2009.

Huang, et al., Erasure Coding in Windows Azure Storage, https://www.microsoft.com/en-us/research/wp-content/uploads/2016/02/LRC12-cheng20webpage.pdf, Dec. 26, 2016 (last accessed).

Wikipedia, Erasure Code, https://en.wikipedia.org/wiki/Erasure_code, Dec. 26, 2016 (last accessed).

Wikipedia, Parity Bit, https://en.wikipedia.org/wiki/Parity_bit, Dec. 26, 2016 (last accessed).

* cited by examiner

SYSTEMS AND METHODS FOR STORING DATA

BACKGROUND

During business operations and data exploration, enterprise organizations are purchasing more and more storage solutions. Different storage solutions provide different levels of availability, durability, and price-performance. In many cases, the storage solutions involve customized and dedicated hardware devices. In contrast, heterogeneous storage solutions may not be utilized, which can constitute a significant waste. Additionally, different storage solutions may involve different quality-of-service metrics.

For high durability, enterprise organizations may use data redundancy. Unfortunately, traditional 1+N replica configurations may consume excessive storage space. Additionally, hard-RAID or soft-RAID storage solutions may run on homogeneous media devices, and therefore fail to consume fully heterogeneous media devices, when available. Specifically, the storage solutions may be limited by the "Weak/Eventual Consistency Model" of cloud storage and related storage, which may suffer from occasional downtimes that are unacceptable according to many business specifications. Due to these performance limitations, leveraging cloud storage or related systems as the backend target storage for a deduplication storage system would involve more than simply just redirecting data input/output. Accordingly, the instant disclosure identifies and addresses a need for improved systems and methods for storing data, as discussed further below.

SUMMARY

As will be described in greater detail below, the instant disclosure describes various systems and methods for storing data in a manner that solves one or more of the shortcomings outlined above. In one example, a computer-implemented method for storing data may include (i) identifying a request to backup a set of data according to a storage-as-a-service configuration that stores data into cloud storage, (ii) dividing the set of data to be backed up into chunks of data, (iii) dividing, for each of the chunks of data, a respective chunk into blocks of data, (iv) generating, for each of the chunks of data, at least one block of parity bits for the respective chunk of data based on applying an erasure code to the blocks of data, and (v) splitting, during backing up the chunks of data according to the storage-as-a-service configuration, the respective blocks of data and the generated block of parity bits into heterogeneous storage media targets such that the storage-as-a-service configuration benefits from the heterogeneous storage media targets by increasing consumption of available storage in comparison to a homogeneous solution.

In one embodiment, the chunks of data each has the same size. In some examples, dividing the respective chunk into the blocks of data and generating the block of parity bits are performed in at least one of the following manners: (i) inline as the storage-as-a-service configuration receives the chunks of data, (ii) offline, after the storage-as-a-service configuration receives the chunks of data, and/or (iii) in response to a system load.

In some examples, the computer-implemented method may further include appending a checksum code to each block of data in each of the chunks of data. In one embodiment, a mathematical level of data redundancy for backing up the chunks of data within the storage-as-a-service configuration is less than 1.5 and/or less than a mathematical level of data redundancy in the homogenous solution.

In one embodiment, at least two chunks are split into a different number of blocks of data according to different parameters of the erasure code. In one embodiment, the heterogeneous storage media targets are provided by different corporate storage-as-a-service vendors.

In one embodiment, the heterogeneous storage media targets include different models of storage hardware that have substantially different levels of performance in terms of at least one of price, latency, and reliability. In one embodiment, the block of parity bits for each chunk is stored within a storage media target having a lower level of performance than at least one storage media target that stores a block of data based on a prediction that the block of parity bits will be accessed less frequently. In one embodiment, the storage-as-a-service configuration stores the chunks of data in a deduplicated format.

In one embodiment, a system for implementing the above-described method may include (i) an identification module, stored in memory, that identifies a request to backup a set of data according to a storage-as-a-service configuration that stores data into cloud storage, (ii) a dividing module, stored in memory, that divides the set of data to be backed up into chunks of data and that (iii) divides, for each of the chunks of data, a respective chunk into blocks of data, (iv) a generation module, stored in memory, that generates, for each of the chunks of data, at least one block of parity bits for the respective chunk of data based on applying an erasure code to the blocks of data, (v) a splitting module, stored in memory, that splits, during backing up the chunks of data according to the storage-as-a-service configuration, the respective blocks of data and the generated block of parity bits into heterogeneous storage media targets such that the storage-as-a-service configuration benefits from the heterogeneous storage media targets by increasing consumption of available storage in comparison to a homogeneous solution, and (vi) at least one physical processor configured to execute the identification module, the dividing module, the generation module, and the splitting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a request to backup a set of data according to a storage-as-a-service configuration that stores data into cloud storage, (ii) divide the set of data to be backed up into chunks of data, (iii) divide, for each of the chunks of data, a respective chunk into blocks of data, (iv) generate, for each of the chunks of data, at least one block of parity bits for the respective chunk of data based on applying an erasure code to the blocks of data, and (v) split, during backing up the chunks of data according to the storage-as-a-service configuration, the respective blocks of data and the generated block of parity bits into heterogeneous storage media targets such that the storage-as-a-service configuration benefits from the heterogeneous storage media targets by increasing consumption of available storage in comparison to a homogeneous solution.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for storing data. More specifically, the disclosed systems and methods may leverage an erasure code to overcome problems associated with the use of replica-based backup storage systems on homogeneous storage media targets. The use of the erasure code may reduce the level of redundancy in the overall storage system and thereby achieve a comparable or satisfactory measure of reliability and durability, in comparison to a replica-based backup storage system on homogeneous storage media targets, as discussed further below. Additionally, the use of the erasure code may enable the overall storage system to consume heterogeneous storage media targets, when available, which would otherwise go unused on the replica-based backup storage systems on homogeneous storage media targets. Furthermore, the use of the erasure code may enable a deduplication storage system to store data through one or more storage-as-a-service services, thereby storing data to the cloud. In contrast, the traditional failure or omission of the erasure code has prevented the storage-as-a-service services from providing sufficient reliability and durability to satisfy deduplication storage system specifications, as discussed further below. In general, the disclosed systems and methods may generate a block of parity bits, according to the erasure code, and store the divided data as well as the block of parity bits to the cloud to thereby achieve one or more of the benefits outlined above.

Figure 1:
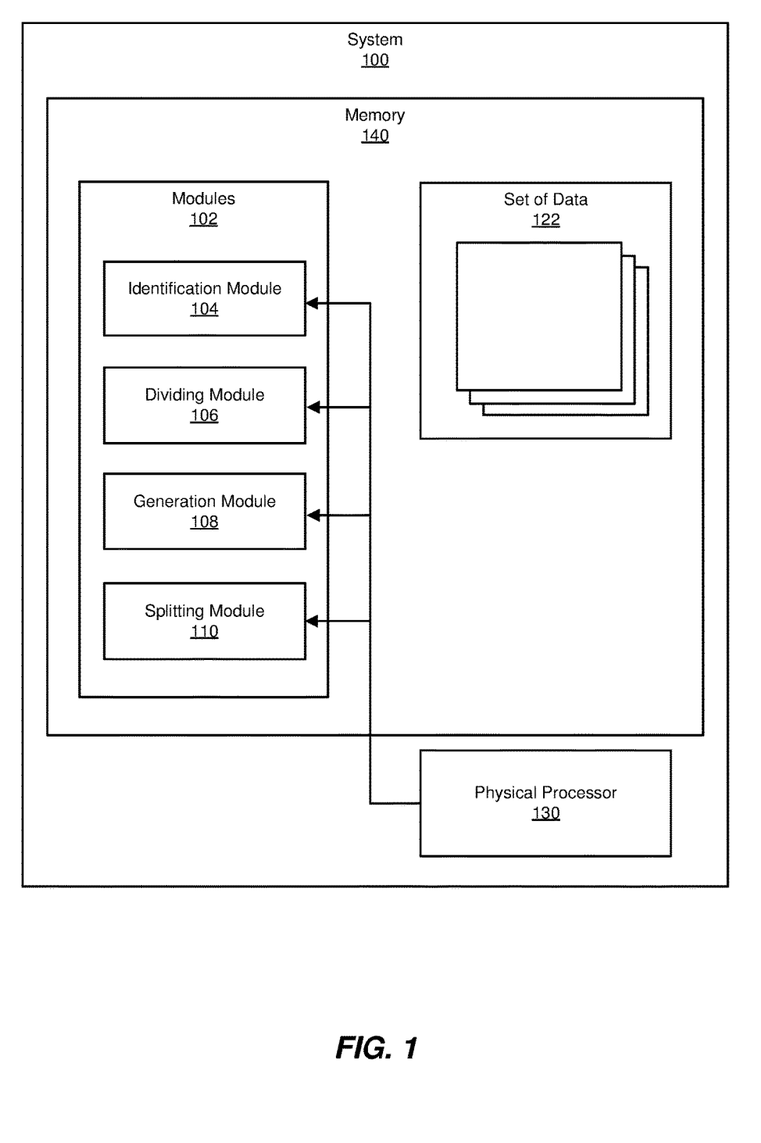
FIG. 1 is a block diagram of an example system for storing data.
Figure 2:
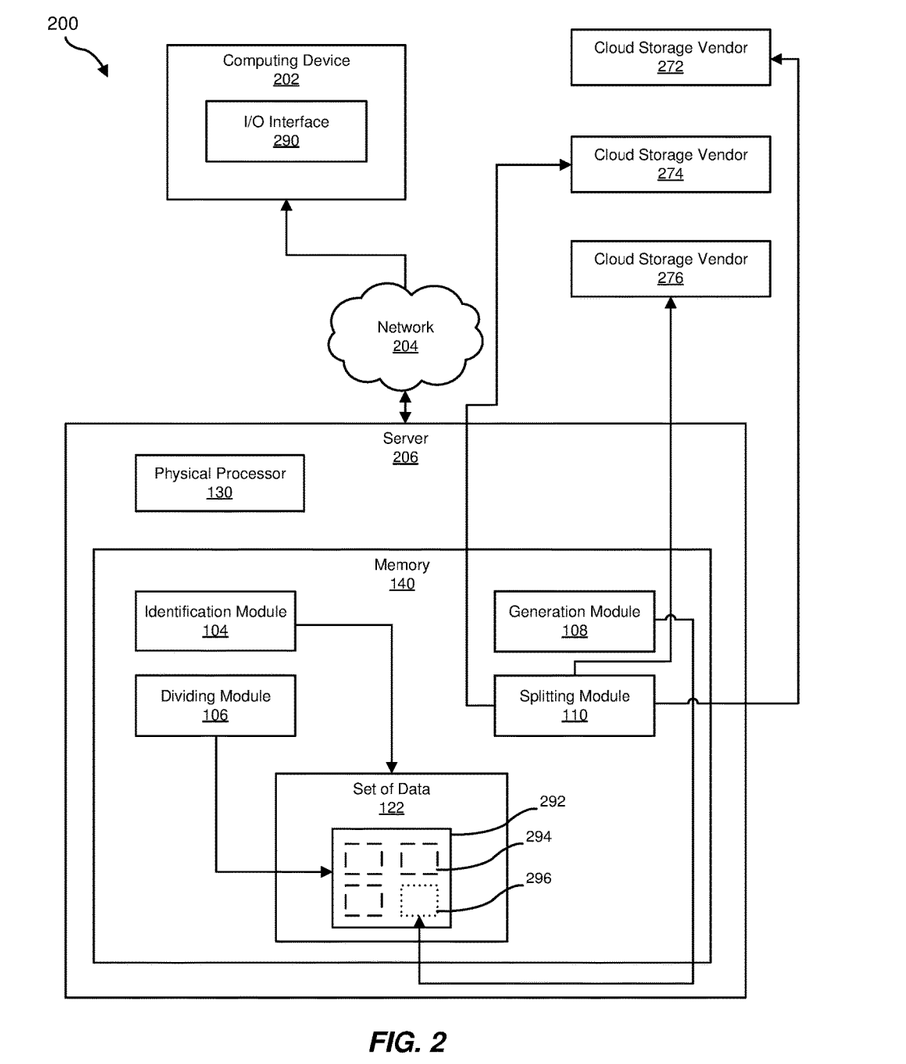
FIG. 2 is a block diagram of an additional example system for storing data.

The following will provide, with reference to FIGS. 1-2, detailed descriptions of example systems for storing data. Detailed descriptions of corresponding computer-implemented methods will also be provided in connection with FIGS. 3-5.

FIG. 1 is a block diagram of exemplary system 100 for storing data. As illustrated in this figure, exemplary system 100 may include one or more modules 102 for performing one or more tasks. For example, and as will be explained in greater detail below, exemplary system 100 may include an identification module 104 that identifies a request to backup a set of data, such as a set of data 122, according to a storage-as-a-service configuration that stores data into cloud storage. Exemplary system 100 may additionally include a dividing module 106 that divides the set of data to be backed up into chunks of data. Dividing module 106 may further divide, for each of the chunks of data, a respective chunk into blocks of data. Exemplary system 100 may also include a generation module 108 that generates, for each of the chunks of data, at least one block of parity bits for the respective chunk of data based on applying an erasure code to the blocks of data. Exemplary system 100 may additionally include a splitting module 110 that splits, during backing up the chunks of data according to the storage-as-a-service configuration, the respective blocks of data and the generated block of parity bits into heterogeneous storage media targets such that the storage-as-a-service configuration benefits from the heterogeneous storage media targets by increasing consumption of available storage in comparison to a homogeneous solution. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate storing data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to store data in accordance with method 300, as outlined below.

Computing device 202 generally represents any type or form of computing device capable of reading computer-executable instructions. In some examples, computing device 202 may function as a client device, including an I/O interface 290, through which a client or customer may upload data to server 206, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of backing up data in accordance with method 300, as discussed further below. In some examples, computing device 202 and server 206 may be merged into a single computing device, which performs method 300 and thereby backs up data to one or more cloud storage vendors, such as a cloud storage vendor 272, a cloud storage vendor 274, and a cloud storage vendor 276. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
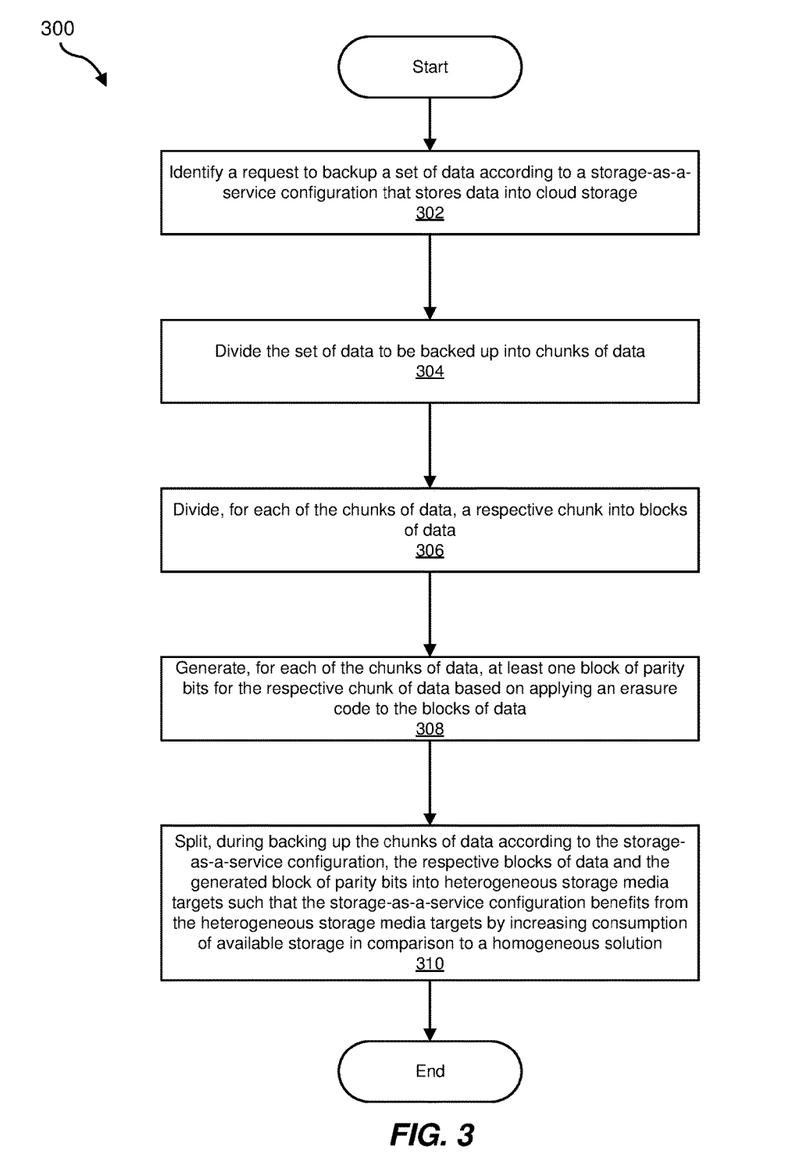
FIG. 3 is a flow diagram of an example method for storing data.

FIG. 3 is a flow diagram of an example computer-implemented method 300 for storing data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to backup a set of data according to a storage-as-a-service configuration that stores data into cloud storage. For example, identification module 104 may, as part of server 206 in FIG. 2, identify a request to backup set of data 122 according to a storage-as-a-service configuration that stores data into cloud storage. As used herein, the term "storage-as-a-service configuration" generally refers to any configuration or service that provides cloud storage for a fee or in accordance with a business arrangement.

Identification module 104 may identify the request to backup the set of data in a variety of ways. In general, identification module 104 may identify either a manual request to backup the set of data or an automated or autonomous request to backup the set of data. For example, a human user may manually request, or issue a command, to back up the set of data. More specifically, a human user at computing device 202 in FIG. 2 may enter input, through device such as a keyboard or mouse, that triggers the request to backup the set of data. Additionally, or alternatively, a software program, storage system, and/or other component may issue the request to back up the set of data according to a predefined or established schedule, period, interval, and/or timing.

At step 304, one or more of the systems described herein may divide the set of data to be backed up into chunks of data. For example, dividing module 106 may, as part of server 206 in FIG. 2, divide set of data 122 to be backed up into chunks of data. As used herein, the term "chunk" generally refers to a divided portion of an overall set of data, such as set of data 122. Additionally, as used herein, the term "chunk" generally refers to a divided portion of an overall set of data that optionally is further divided into "blocks" of data, as further discussed below. Additionally, as used herein, the term "chunk" generally refers to generally refers to a source data unit for a system to perform one calculation or application of the erasure code, as discussed further below in connection with step 308.

Dividing module 106 may divide the set of data in a variety of ways. In one embodiment, the chunks of data each has the same size. In other words, dividing module 106 may divide the set of data into equal sized portions, which may correspond to the chunks of data. Notably, dividing module 106 may divide the set of data such that each of the resulting chunks of data may be further divided and processed according to an erasure code, as discussed further below in accordance with step 306 of method 300.

Returning to FIG. 3, at step 306, one or more of the systems described herein may divide, for each of the chunks of data, a respective chunk into blocks of data. For example, at step 306, dividing module 106 may divide a respective chunk data into blocks of data. As further outlined above, the term "block" generally refers to a divided portion of a chunk of data in accordance with an erasure code.

For purposes of illustration, FIG. 2 further shows that set of data 122 may include a chunk 292. As further shown in this figure, chunk 292 may be further divided into blocks of data, including a block 294.

Dividing module 106 may divide the respective chunk into blocks of data in a variety of ways. In some examples, dividing module 106 may divide the respective chunk into the blocks of data in at least one of the following manners: (i) inline as the storage-as-a-service configuration receives the chunks of data, (ii) offline, after the storage-as-a-service configuration receives the chunks of data, and/or (iii) in response to a system load. Similarly, generation module 108 may generate the block of parity bits and one or more of these manners, as further discussed below in connection with step 308.

Additionally, in some examples, dividing module 106 may further append a checksum code to each block of data in each of the chunks of data. Appending the checksum code to each block of data may facilitate quick and convenient error detection to check whether a block of data has become corrupted or otherwise failed.

Returning to FIG. 3, at step 308, one or more of the systems described herein may generate, for each of the chunks of data, at least one block of parity bits for the respective chunk of data based on applying an erasure code to the blocks of data. For example, at step 308, generation module 108 may generate a block of parity bits, such as a block 296 shown in FIG. 2, for the respective chunk 292, based on applying the erasure code to the blocks of data (e.g., including block 294). Notably, in the example of FIG. 2, three of the blocks within chunk 292 have a different dashed line formatting than block 296, which indicates that these three blocks, including block 294, are blocks of data as distinct from block 296, which is a block of parity bits, as discussed further below.

As used herein, the term "parity bits" generally refers to a bit added to a string of binary code that indicates whether the number of one-bits in the string is even or odd. Parity bits thereby provide a simple form of error detection. In additional or alternative examples, other forms of error detection codes and protocols may be used. Additionally, as used herein, the term "erasure code" generally refers to a forward error correction code for the binary erasure channel, which transforms a message of "k" symbols into a longer message (i.e., "code word") with "n" symbols such that the original message can be recovered from a subset of the n symbols. In some specific examples, the erasure code of step 308 translates a chunk, such as chunk 292, into a longer message by generating the block of parity bits, such as block 296, which enables the entire chunk to be recovered even if a subset of the blocks of data becomes lost or corrupted, as discussed further below.

Generation module 108 may generate the block of parity bits in a variety of ways. In general, generation module 108 may generate the block of parity bits by setting each bit as one or zero to indicate whether a corresponding string, within the blocks of data, hasn't art or even number of one-bits, as further discussed above. Notably, step 306 and step 308 may be performed in tandem, simultaneously, and/or in coordination with each other, in accordance with the erasure code. For example, values for parameters of the erasure code may specify the size and number of the blocks of data, as well as the size and number of the block(s) of parity bits. More specifically, specifying values for parameters of the erasure code may further specify a size and number of the blocks of data, which may necessarily result in a corresponding size and number of block(s) of parity bits.

Notably, the values for the parameters of the erasure code, and the corresponding size and number of blocks of data and block(s) of parity bits, may vary between different chunks of the set of data. For example, the values for the parameters of the erasure code may be tuned to increase, or decrease, a level of redundancy, reliability, and/or durability such that the corresponding chunk of data is easier, or more difficult, to recover after the corruption of one or more blocks of data. Accordingly, if one chunk of data in the set of data is more sensitive or valuable than another chunk of data, then dividing module 106 and generation module 108 may divide that particular chunk, and generate the corresponding parity bits, using one or more values for parameters of the erasure code that increases the level of redundancy, reliability, and/or durability, as discussed above. In general, dividing module 106 and/or generation module 108 may divide the chunk and generate the parity bits in accordance with erasure code parameters that are tuned, personalized, and/or matched to features and/or attributes of the respective chunk. This process may result in variation and personalization in the application of the erasure code to each of the chunks of data. In other words, in one embodiment, at least two chunks are split into a different number of blocks of data according to different parameters of the erasure code, as discussed further below in connection with step 310.

At step 310, one or more of the systems described herein may split, during backing up the chunks of data according to the storage-as-a-service configuration, the respective blocks of data and the generated block of parity bits into heterogeneous storage media targets such that the storage-as-a-service configuration benefits from the heterogeneous storage media targets by increasing consumption of available storage in comparison to a homogeneous solution. For example, splitting module 110 may, as part of server 206 in FIG. 2, split, during backing up the chunks of data, including chunk 292, according to the storage-as-a-service configuration, the respective blocks of data and the generated block 296 of parity bits into heterogeneous storage media targets (including cloud storage vendor 272, cloud storage vendor 274, and cloud storage vendor 276) such that the storage-as-a-service configuration benefits from the heterogeneous storage media targets by increasing consumption of available storage in comparison to a homogeneous solution.

As used herein, the phrase "split, during backing up the chunks of data" generally refers to backing up the respective blocks of data and block(s) of parity bits, for each of the chunks of data, in a manner that stores them into the heterogeneous storage media targets. In other words, the phrase refers to splitting module 110 storing at least two blocks, from among the blocks of data and the block(s) of parity bits, into different and heterogeneous storage media targets. In some examples, splitting module 110 may store each of these blocks, within the blocks of data and the block(s) of parity bits, into a different and heterogeneous storage media targets, respectively.

As used herein, the term "heterogeneous storage media targets" generally refers to storage media targets (e.g., disk drives, tape drives, and/or other data storage mediums) that are heterogeneous in the sense that they vary substantially, or according to a predefined statistical measurement and/or corresponding threshold, in terms of price, price-performance, durability, reliability, latency, and/or location. In other words, at least two of these blocks are stored on storage media targets that are either located remotely and independently of each other (e.g., part of different cloud storage vendor regions, as defined by the respective client storage vendor, or part of different cloud storage vendors entirely), and/or that have substantially different model numbers, type numbers, and/or brands. In general, the heterogeneous storage media targets create a level of variation that is missing from a conventional hard or soft RAID backup storage system that stores data, in accordance with a 1+N replica model, using homogeneous storage media targets (e.g., identical model and type data storage drives grouped together on a rack or RAID configuration). In general, as used herein, the terms "heterogeneous" and "homogeneous" are used as opposites or negations of each other.

Additionally, as used herein, the phrase "such that the storage-as-a-service configuration benefits from the heterogeneous storage media targets by increasing consumption of available storage in comparison to a homogeneous solution" generally refers to the storage-as-a-service configuration being able to consume or use different and heterogeneous storage media targets, as discussed above, by leveraging the use of the erasure code, when other systems that failed to use the erasure code would generally involve or require the homogeneous solution, such as the hard or soft RAID backup storage system. In other words, the use of the erasure code at the level of each respective chunk enables the overall storage-as-a-service configuration to store data on heterogeneous storage media targets, which may have been previously available but unused due to the limitations and requirements of other storage systems that do not leverage the use of the erasure code (and, therefore, use or require a homogeneous solution). The use of the erasure code thereby prevents the waste of these unused yet available heterogeneous storage media targets, in addition to optionally obtaining the numerous other benefits that are further outlined below. Notably, in other examples, this benefit ("increasing consumption of available storage") may be substituted or supplemented with any one or more of the other benefits that may be obtained through method 300, as discussed further above and below.

Notably, in some examples, a mathematical level of data redundancy for backing up the chunks of data (e.g., a ratio of the total size of final data stored in comparison to the size of the original data before formatting and application of the erasure code) within the storage-as-a-service configuration is less than 1.5 and/or less than a mathematical level of data redundancy in the homogenous solution. In other words, a traditional homogeneous 1+N replica solution may store multiple instances of the same set of data for redundancy and reliability purposes, thereby creating a mathematical level of data redundancy of 2.0 or greater. In contrast, the mathematical level of data redundancy, in accordance with method 300, may be 1.5 or less, because method 300 simply adds the block(s) of parity bits rather than adding entire copies of the original set of data.

Splitting module 110 may split the respective blocks of data and generated block of parity bits for each chunk in a variety of ways. In one embodiment, the storage-as-a-service configuration stores the chunks of data in a deduplicated format. In other words, the storage-as-a-service configuration may remove at least one redundant portion of data, within the set of data, and simply replace the removed portions of data with references to a single instance of the otherwise redundant portions. Notably, the use of storage-as-a-service configurations for data deduplication storage may have been previously impossible, without leveraging the use of the erasure code at the level of each respective chunk within the set of data, due to latency and reliability limitations that are associated with these configurations and cloud storage.

Figure 4:
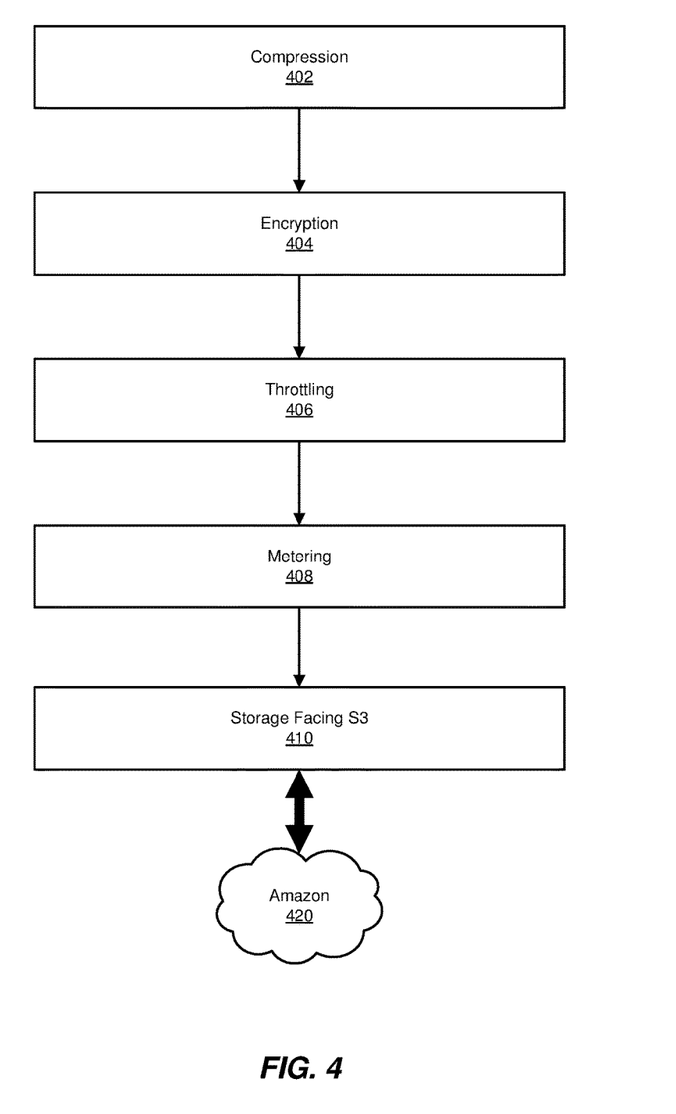
FIG. 4 is a flow diagram of an additional example method for storing data.

In further embodiment, the heterogeneous storage media targets are provided by different corporate storage-as-a-service vendors. For illustrative purposes, FIG. 4 shows a flow diagram for related system that stores a set of data using a homogeneous solution at a single storage-as-a-service vendor. In this case, the storage-as-a-service vendor corresponds to AMAZON and its S3 cloud storage service. In this related system, a set of data may be compressed, at compression 402, encrypted, at encryption 404, throttled (e.g., regulating a speed or intake of data at the storage-as-a-service configuration), at throttling 406, and/or metered (e.g., measuring an amount of uploaded data for pricing and/or billing purposes), at metering 408, before reaching a storage facing S3 step 410, which may correspond to an application programming interface for interfacing with AMAZON'S S3 cloud storage service, thereby resulting in the uploading of the set of data to AMAZON at step 420. Notably, in some examples, one or more of these steps may be omitted and/or the order may be reversed or altered.

Figure 5:
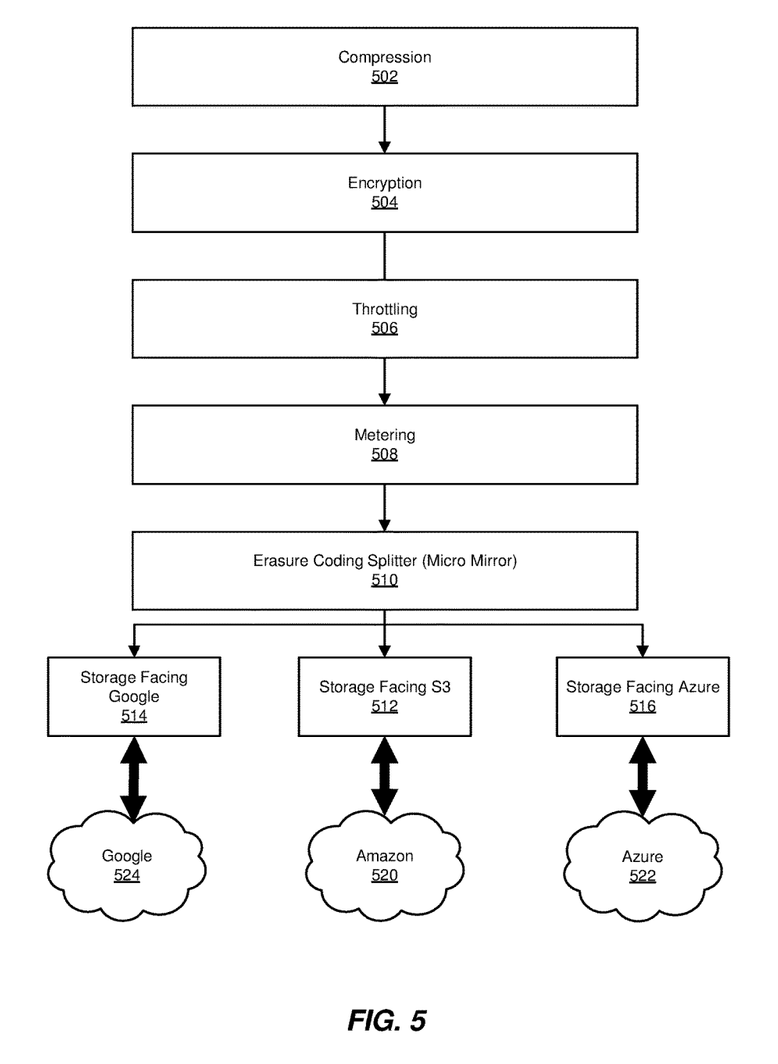
FIG. 5 is a flow diagram of an additional example method for storing data.

In contrast, as further shown in the illustration of FIG. 5, the systems and methods described herein operate in accordance with a flow diagram that substantially parallels that of FIG. 4 but that also inserts an erasure coding splitter, or micro mirror, at erasure code splitter 510. Compression 502, encryption 504, throttling 506, and/or metering 508 may otherwise parallel the corresponding steps shown in FIG. 4. Erasure coding splitter 510 may correspond to splitting module 110, as further discussed above. As shown in FIG. 5, splitting module 110 may split different blocks of data and/or parity block(s) among different heterogeneous storage media targets. In this specific example, splitting module 110 splits different blocks among three separate cloud storage vendors, GOOGLE 524 (corresponding to storage facing GOOGLE 514), AMAZON 520 (corresponding to storage facing S3 512), and AZURE 522 (corresponding to storage facing AZURE 516). In other, splitting module 110 may split different blocks, corresponding to the same chunk, at different regions within a single cloud storage vendor. In these examples, the different regions may be predefined and established by the cloud storage vendor as separate and independent regions (thereby providing benefits in terms of redundancy, reliability, and/or resiliency). Additionally, in some examples, splitting module 110 may operate, at the step of erasure coding splitter 510, which may be relocated in between compression 502 and encryption 504 rather than after metering 508. In these examples, metering 508 may proceed directly to storage facing GOOGLE 514, storage facing S3 512, and storage facing AZURE 516.

As further discussed above, splitting module 110, alone and/or in coordination with dividing module 106 and/or generation module 108, may generally tune, tailor, personalize, and/or match (i) one or more attributes of a chunk of data and (ii) values for parameters for the erasure code as applied to that chunk of data. Similarly, splitting module 110 may generally tune, tailor, personalize, and/or match one or more blocks of data and/or parity bits with one or more of the heterogeneous storage media targets. For example, in one embodiment, the block of parity bits for each chunk is stored within a storage media target having a lower level of performance than at least one storage media target that stores a block of data based on a prediction that the block of parity bits will be accessed less frequently. By way of background, according to the erasure code, the block of parity bits may only be accessed and used in the case that one or more blocks of data has become lost or corrupted. Accordingly, the block of parity bits may be used less frequently than the corresponding blocks of data. In general, splitting module 110 may store or upload a block of data or parity bits to a storage media target that has a higher level of security or reliability based on a determination that the block of data or parity bits has a higher level of value or sensitivity, and vice versa for blocks of data or parity bits that have lower levels of value or sensitivity. In general, splitting module 110 may correlate variation among (1) chunks, (2) blocks, (3) erasure code parameter values (e.g., more or fewer data blocks and/or parity bits), and/or (4) heterogeneous storage media target locations and/or attributes. Moreover, the performance of these personalization and/or matching steps may occur for each chunk and/or block within the set of data, or simply for some of the chunks and/or blocks.

The above discussion provides an overview of method 300 in FIG. 3. Additionally, the following discussion provides a more concrete and detail oriented overview of various embodiments of the disclosed systems and methods. Notably, in the following discussion, any one or more of modules 102, according to any permutation, may perform any of the actions, steps, and/or operations discussed below, as appropriate, and consistent with the above discussion of method 300.

The disclosed systems and methods are directed to the area of data protection. The disclosed systems and methods leverage erasure codes on heterogeneous media devices to improve data reliability and reduce storage cost.

The disclosed systems and methods enable enterprises to make full (or more complete) use of heterogeneous media devices and thereby reduce the cost of storage. Additionally, the disclosed systems and methods ensure a high level of data reliability. The disclosed systems and methods also enable configurations with well-controlled and flexible quality of service. Nevertheless, traditional 1+N replicas mechanisms on the backend server are not a good choice. Customers may not accept the level of performance and reliability that a deduplication storage system would obtain using a traditional 1+N replicas mechanism on the backend server or cloud storage. Similar problems arise from a write-once/read-many storage system or other generic storage system. More specifically, if the data was stored in cloud storage, then temporary data unavailability or partial downtime of service may result in degraded read operations and significantly impact business continuity.

Some systems use RAID or erasure code configurations on homogeneous media devices. In many business scenarios, parity information requires less I/O consumption and has lower access frequency in comparison to data information. Accordingly, storing both the parity information and the data information ambiguously and non-distinctively on the same hardware is a waste of storage.

In the erasure code field, the following terms may be used: (1) k, the number of data blocks, (2) m, the number of parity blocks, and (3) n, the number of output blocks generated by applying erasure code on one data chunk. Notably, according to the erasure code, n=k+m. Similarly, the term "data chunk" generally refers to the source data unit for a system to perform one calculation or application of the erasure code. A chunk is similar to the concept of the source data of one stripe in a RAID configuration, but a chunk is indexed per an item of data rather than indexed per a hardware disk.

One important property of the erasure code is that if any m of the n blocks fails, regardless of whether these are data blocks and/or parity blocks, the data content can be reconstructed from the k surviving blocks. Another property of the erasure code is that if no data corruption happens, then there will be no overhead on the read of data. It is therefore straightforward to read the k data blocks. Compared to a traditional 1+N replicas mechanism, the erasure code configuration has much lower data redundancy while having the same reliability level. Accordingly, the erasure code generates benefits in terms of both storage usage and I/O consumption. Notably, according to the disclosed systems and methods, each data chunk can be individually treated with different k and m combinations, so therefore quality of service can be performed, or personalized, based on varying categories of data in a flexible way.

The storage system according to the disclosed systems and methods includes several heterogeneous media devices. One data chunk is split into k data blocks, and m parity blocks are computed from the k data blocks. So, in total, n=k+m blocks will be generated or stored. Eventually the n blocks are persisted onto n different media devices.

Notably, in some embodiments, the disclosed systems and methods are not limited to hardware level heterogeneity. Instead, the disclosed systems and methods may operate on different hardware devices, or on different media topologies, or on different filesystems, or on different storage management systems, or on different storage products, or on different locations or regions, or on different Internet service providers (ISP), and/or on a mixture of one or more of these. Data protection policies can be customized flexibly. Hardware properties and erasure code parameters can be combined together (i.e., in k+m combinations). Similarly, different media device combinations can be matched to different data blocks and/or parity blocks.

The "Weak/Eventual Consistency Model" and temporary data unavailability or frequent partial downtime of service are big concerns for cloud storage. To eliminate or reduce the impact of these and maintain business continuity, the leveraging or application of erasure coding in front of cloud services and across different region-specific website endpoints is a good alternative. For example, AMAZON S3 is a region-aware service which provides 11+ region-specific website endpoints (which may correspond to elements 514, 512, and/or 516 in FIG. 5). There are also ISPs and other cloud infrastructures with different price models and characters for use.

Parity information requires less I/O consumption and has a lower level of access frequency in comparison to data information. The size of parity information is typically smaller than the size of the data. Additionally, parity information is typically not read unless a data corruption happens, which is relatively infrequent. In view of the above, parity information could be persisted onto lower performance and lower price storage media devices with little or no overhead on the system compared to a homogeneous solution.

The speed of a plain data write operation is typically constrained by the lowest-performance hardware. A staging mechanism, or some other asynchronous-type mechanism, can be leveraged together to eliminate or reduce this constraint. In most scenarios, parity blocks would not be read unless data corruption happens. So, typically, there is no overhead on data read operations. When data corruption happens, the data read operation speed is constrained by the speed for the parity blocks.

Some systems may use erasure codes to save space and prevent data partition. Nevertheless, related systems have never leveraged the use of erasure codes on heterogeneous storage media targets or devices, as further discussed above.

According to the disclosed systems and methods, one data chunk may be split into m data blocks with the same block size, and k parity blocks may be calculated from the m data blocks. So, in this example, there would be n=m+k blocks generated in total. Additionally, the data redundancy is n/m. Eventually the n blocks would be persisted, or stored, onto n different media devices.

The following provides a discussion of erasure codes in the context of data ingestion or data backup. The basic process is as follows. One data stream is divided (e.g., by dividing module 106) into a series of fixed-length data chunks logically, and one data chunk is composed of m fixed-length data blocks. For each data chunk, k parity blocks are calculated from them data blocks (e.g., by generation module 108). The calculation and persistence of the parity blocks can occur at various points of time according to various implementation details and/or business requirements. For example, these operations can occur inline or off-line, synchronously or asynchronously, on demand, or in response to system loads. These operations can also leverage a staging mechanism to improve system availability.

Eventually, the m data blocks and k parity blocks are dispersed, or stored, onto different media devices (e.g., by splitting module 110). Practically, but not essentially, a checksum code of one block could be appended to each block for quick and easy error detection (e.g., by dividing module 106).

The following provides a discussion of erasure codes in the context of a data update. If the data update is directed to a part of one data chunk, the related data blocks may benefit from being changed. Additionally, all of the k parity blocks may benefit from being recalibrated. One alternative in these cases is not to actually change the data chunk, but instead to simply update the whole data chunk and expire the previous version. So, in the practical real world, enterprise organizations may balance the cost between data in-place update and ingest-only mechanisms.

The following provides a discussion of erasure codes in the context of a data restore operation or data random read operation. In most cases, if the requested data is directed to a part of, or the whole, data chunk, then the related data blocks may be obtained. But in the case of a data corruption or data unavailability, for any of various reasons, then at least m healthy blocks may be fetched. Subsequently, the whole data chunk may be reconstructed (e.g., by splitting module 110) from the m blocks. Additionally, after the restore operation, the corrupted blocks may be repaired and the requested data may be returned to the data receiver or requester. Additionally, the data repair operation can be performed at any point of time. The data repair operation can also leverage a staging mechanism to improve system availability.

The following provides a discussion of data durability in the context of erasure codes. If there are more than n media devices in the overall system, and the data blocks and parity blocks are (e.g., always) persisted onto different devices, then the system may make each data chunk tolerate up to k blocks failing. If there are less than n media devices in the system, then the system may tolerate up to "device number−m" devices failing.

The following provides a discussion of data redundancy in the context of erasure codes. The total blocks n may include, or may be composed of, the m data blocks and the k parity blocks. So the data redundancy would be n/m. In a practical, real-world scenario, k will typically be less than m/2, so the data redundancy is typically less than 1.5, which is much less than the mathematical level of data redundancy in the traditional 1+N replicas model.

The following provides a discussion of quality of service issues in the context of erasure codes. Each data chunk can be separately treated, tuned, handled, matched, and/or personalized (as discussed further above) with different data block and parity block combinations (e.g., different values for k, n, and/or m). Additionally, these different blocks can be dispersed onto, or stored onto, different media devices with different properties. Accordingly, the quality of service can be tuned, customized, and/or personalized for various types or categories of data in a flexible manner, as further discussed above.

The following provides a discussion of erasure codes in the context of a deduplication system that that leverages a storage-as-a-service or cloud storage vendor for backend storage. For several reasons, leveraging cloud or scale-out SDS as backend target storage for a deduplication storage system would involve more than simply redirecting the data input and output operations to the cloud or scale-out SDS. First, almost all of cloud storage vendors provide "Weak/Eventual Consistency" but not "Strong Consistency." New data is not very suitable to be de-duplicated against in a very short ingest window for the next short-term data prefetching. Second, the partial downtime of services would be relatively frequent, which is simply a practical reality of modern cloud-based storage systems. From the customer's point of view, to back up multiple copies of de-duplicated data to cloud storage is an unattractive option.

As a specific example, consider AMAZON S3. De-duplicating data to Amazon S3 with erasure coding to different region-specific website endpoints and/or to local or near-line storage is one alternative. Moreover, as further highlighted above, the disclosed systems and methods are not limited to hardware level heterogeneity. The disclosed systems and methods may generally leverage erasure codes to ensure high durability while also saving storage space. Additionally, the disclosed systems and methods leverage and make full use of available heterogeneous media devices, which would otherwise go unused and wasted, thereby reducing cost for enterprise organizations and customers. Furthermore, since data is dispersed on different media devices, or even in different locations/regions, data security and partition tolerance are also improved. Furthermore, different media devices have different properties, and the segmenting of data and the parity number can be easily configured per item, type, and/or category of data. Accordingly, the quality of service for each item, type, and/or category of data can be flexibly controlled.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storing data, at least a portion of the method being performed by a computing device comprising at least one processor, the method comprising:
   identifying a request to backup a set of data according to a storage-as-a-service configuration that stores data into cloud storage;
   dividing the set of data to be backed up into chunks of data;
   dividing, for each of the chunks of data, a respective chunk into blocks of data;
   generating, for each of the chunks of data, at least one block of parity bits for the respective chunk of data based on applying an erasure code to the blocks of data; and
   splitting, during backing up the chunks of data according to the storage-as-a-service configuration, the respective blocks of data and the generated block of parity bits into heterogeneous storage media targets.

2. The computer-implemented method of claim 1, wherein the chunks of data each has the same size.

3. The computer-implemented method of claim 1, wherein dividing the respective chunk into the blocks of data and generating the block of parity bits are performed in at least one of the following manners:
   inline as the storage-as-a-service configuration receives the chunks of data;
   offline, after the storage-as-a-service configuration receives the chunks of data; and
   in response to a system load.

4. The computer-implemented method of claim 1, further comprising appending a checksum code to each block of data in each of the chunks of data.

5. The computer-implemented method of claim 1, wherein a mathematical level of data redundancy for backing up the chunks of data within the storage-as-a-service configuration is
less than 1.5.

6. The computer-implemented method of claim 1, wherein at least two chunks are split into a different number of blocks of data according to different parameters of the erasure code.

7. The computer-implemented method of claim 1, wherein the heterogeneous storage media targets are provided by different corporate storage-as-a-service vendors.

8. The computer-implemented method of claim 1, wherein the heterogeneous storage media targets comprise different models of storage hardware that have substantially different levels of performance in terms of at least one of price, latency, and reliability.

9. The computer-implemented method of claim 8, wherein the block of parity bits for each chunk is stored within a storage media target having a lower level of performance than at least one storage media target that stores a block of data based on a prediction that the block of parity bits will be accessed less frequently.

10. The computer-implemented method of claim 1, wherein the storage-as-a-service configuration stores the chunks of data in a deduplicated format.

11. A system for storing data, the system comprising:
an identification module, stored in memory, that identifies a request to backup a set of data according to a storage-as-a-service configuration that stores data into cloud storage;
a dividing module, stored in memory, that:
divides the set of data to be backed up into chunks of data;
divides, for each of the chunks of data, a respective chunk into blocks of data;
a generation module, stored in memory, that generates, for each of the chunks of data, at least one block of parity bits for the respective chunk of data based on applying an erasure code to the blocks of data;
a splitting module, stored in memory, that splits, during backing up the chunks of data according to the storage-as-a-service configuration, the respective blocks of data and the generated block of parity bits into heterogeneous storage media targets; and
at least one physical processor configured to execute the identification module, the dividing module, the generation module, and the splitting module.

12. The system of claim 11, wherein the chunks of data each has the same size.

13. The system of claim 11, wherein the dividing module divides the respective chunk into the blocks of data and the generation module generates the block of parity bits in at least one of the following manners:
inline as the storage-as-a-service configuration receives the chunks of data;
offline, after the storage-as-a-service configuration receives the chunks of data; and
in response to a system load.

14. The system of claim 11, wherein the generation module further appends a checksum code to each block of data in each of the chunks of data.

15. The system of claim 11, wherein a mathematical level of data redundancy for backing up the chunks of data within the storage-as-a-service configuration is
less than 1.5.

16. The system of claim 11, wherein at least two chunks are split into a different number of blocks of data according to different parameters of the erasure code.

17. The system of claim 11, wherein the heterogeneous storage media targets are provided by different corporate storage-as-a-service vendors.

18. The system of claim 11, wherein the heterogeneous storage media targets comprise different models of storage hardware that have substantially different levels of performance in terms of at least one of price, latency, and reliability.

19. The system of claim 18, wherein the block of parity bits for each chunk is stored within a storage media target having a lower level of performance than at least one storage media target that stores a block of data based on a prediction that the block of parity bits will be accessed less frequently.

20. A non-transitory computer-readable medium comprising one or more computer-readable instructions that, when executed by at least one processor of a computing device, cause the computing device to:
identify a request to backup a set of data according to a storage-as-a-service configuration that stores data into cloud storage;
divide the set of data to be backed up into chunks of data;
divide, for each of the chunks of data, a respective chunk into blocks of data;
generate, for each of the chunks of data, at least one block of parity bits for the respective chunk of data based on applying an erasure code to the blocks of data; and
split, during backing up the chunks of data according to the storage-as-a-service configuration, the respective blocks of data and the generated block of parity bits into heterogeneous storage media targets.

* * * * *